US006622080B2

(12) United States Patent
Yang et al.

(10) Patent No.: US 6,622,080 B2
(45) Date of Patent: Sep. 16, 2003

(54) TRACKING CONTROL FOR ELECTRONIC THROTTLE SYSTEMS

(75) Inventors: Hanlong Yang, Northville, MI (US);
Louis Yizhang Liu, Troy, MI (US);
Jeffrey D. Naber, Dearborn, MI (US)

(73) Assignee: Motorola, Inc., Schaumburg, IL (US)

( * ) Notice: Subject to any disclaimer, the term of this patent is extended or adjusted under 35 U.S.C. 154(b) by 236 days.

(21) Appl. No.: 09/916,031

(22) Filed: Jul. 26, 2001

(65) Prior Publication Data

US 2003/0023365 A1 Jan. 30, 2003

(51) Int. Cl.$^7$ .................. G06F 19/00; F02D 9/10; F02D 41/14
(52) U.S. Cl. .................. 701/103; 701/110; 701/115; 123/399
(58) Field of Search .................. 701/102, 110, 701/114, 115, 101, 103; 123/399, 361

(56) References Cited

U.S. PATENT DOCUMENTS

| 5,107,193 A | * | 4/1992 | Iwashita | 318/560 |
| 5,313,147 A | * | 5/1994 | Yoneda et al. | 318/569 |
| 5,384,525 A | * | 1/1995 | Kato | 318/610 |
| 6,367,449 B1 | | 4/2002 | Moteki et al. | |

FOREIGN PATENT DOCUMENTS

| EP | 0417312 A1 | 3/1991 |
| EP | 0479136 A1 | 4/1992 |
| EP | 0544003 A1 | 6/1993 |
| JP | 2001 152935 A | 6/2001 |

OTHER PUBLICATIONS

Song G, "Robust Position Regulation of a Rotary Servo Actuated by a Shape memory Alloy Wire", International Symposium on Industrial Electronics, Jun. 12–16, 2001, pp. 1923–1928, XP002213934, Pusan, Korea.

* cited by examiner

Primary Examiner—Hieu T. Vo
(74) Attorney, Agent, or Firm—S. Kevin Pickens

(57) ABSTRACT

An electronic throttle controller (200) includes a feedforward control (222), a PID (224), a sliding mode control (226) and an adder (230). The PID (224) is capable of generating a first feedback term that compensates for an error signal. The sliding mode control (226) is capable of generating a second feedback term that incorporates a solution to a Lyapunov equation applied to the error signal with sliding gain being updated by an estimation of unknown dynamics. The adder (230) adds the first feedback term, the second feedback term and the feedforward control (222) so as to generate a control signal (232).

10 Claims, 2 Drawing Sheets

TRACKING CONTROL FOR ELECTRONIC THROTTLE SYSTEMS

CROSS-REFERENCE TO APPENDIX ON CD-ROM

A CD-ROM Appendix is submitted herewith and is incorporated herein by reference in accordance with 37 CFR § 1.52. The Appendix comprises a single CD-ROM, created on Jul. 19, 2001 that includes one file, entitled "CD ROM Appendix.PDF". This file includes the control system equations and their derivation for one exemplary embodiment of the invention. The appendix is in PDF format and may be viewed using the Adobe® Acrobat® Reader.

BACKGROUND OF THE INVENTION

1. Field of the Invention

The present invention relates to control systems and, more specifically, to a tracking control design applied to an electronic throttle system.

2. Description of the Prior Art

An electronic throttle control system controls the opening of a throttle valve by driving a direct current (DC) motor in accordance with a desired throttle position requested from high level control. In this throttle control, pulse width modulated duty cycle ratio is generated based on throttle position measurement and a desired position signal from a higher level control or an accelerator position sensor which detects the accelerator position corresponding to the depression amount of the accelerator pedal. The PWM with a properly calculated duty cycle ratio will drive the DC motor through the gear train to open or close the throttle valve to the exact desired position to control an intake air amount to the engine. A feedback control of the proportional, integral and derivative (PID) control is performed on the DC motor to reduce errors between a signal from a throttle opening sensor which detects an actual throttle opening of the throttle valve and the desired position signal which can be signal measured from an accelerator position sensor (in pedal follower mode) or a signal generated from a higher level control.

It has been a general design practice to determine each control constant of P(proportional)-term, I(integral)-term and D(derivative)-term of the PID control to fixed intermediate values to meet requirements under all operating conditions of the system. Since the control constants thus determined do not become the optimum values for specific operating conditions, particularly in non-linear systems, responsiveness and stability of the throttle valve control may be degraded. For example, during an idle speed control which stabilizes an engine rotational speed to a predetermined speed under engine idle conditions, the response speed of the throttle valve may be low but the stability must be high and the control should be robust to any disturbances, such as battery voltage drop. Furthermore, during a traction control that optimally controls the force of driving wheels driven by the internal combustion engine in accordance with road surface conditions, the stability of the throttle valve may be lowered to some extent but the response speed must be maintained high. When using cruise control, which controls a constant speed running of a vehicle without operating an accelerator pedal, both high responsiveness and stability are required. The goal of the control is to achieve fast and stable tracking in all circumstances.

The fixed intermediate values of the constants used in existing PID controllers are not optimal for each range of use. Some existing controllers compensate for this by applying gain scheduling PID control, i.e., a different set of constants for each range of use. However, the added complexity associated with doing so reduces dynamic tracking performance and degrades the robustness of the system. Furthermore, calibration of all control parameters at different operating conditions requires extensive work.

Therefore, there is a need for a robust electronic throttle control system that is responsive, robust and fast tracking.

DETAILED DESCRIPTION OF THE INVENTION

A preferred embodiment of the invention is now described in detail. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1:
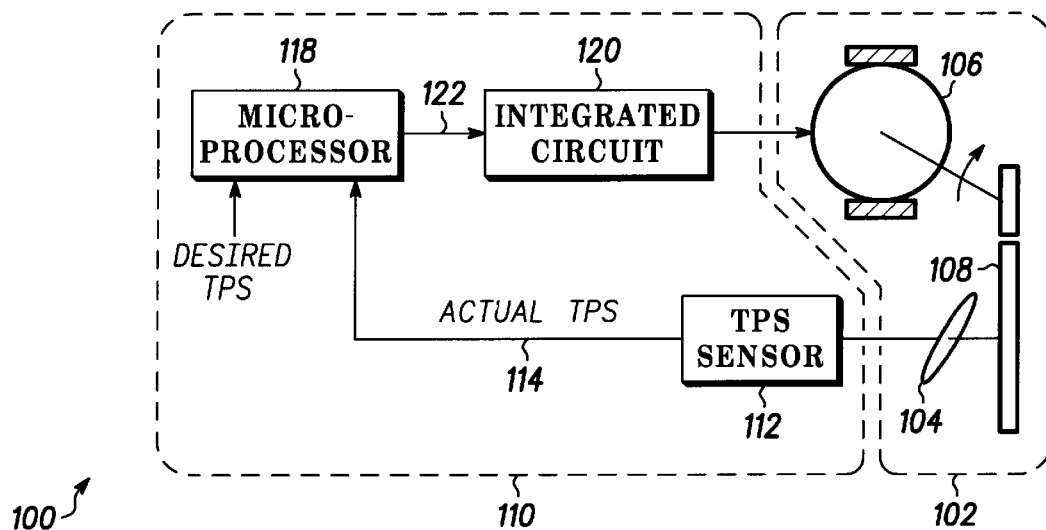
FIG. 1 is a block diagram of an electronic throttle control system according to the invention.

As shown in FIG. 1, in one illustrative embodiment, the present invention resides on a micro-controller 118 or a digital signal processing (DSP) chip as part of a throttle control system 100. The throttle control system 100 includes a mechanical portion 102 and an electrical portion 110. The mechanical portion 102, which is. typically of a type common to the art, includes a throttle blade actuator 106, such as a direct current (DC) actuator motor, that is coupled to a throttle blade 104 via a gear assembly 108. Typically, the throttle blade 104 is spring-loaded so as to tend to maintain a constant position in the absence of additional force from the throttle blade actuator 106. The throttle blade actuator 106 is responsive to a pulse width modulated (PWM) signal from the electrical portion 110.

In the design phase, the electrical portion 110 includes a rapid prototyping tool 118, such as an ADI RTS or dspace Autobox, the algorithm running on the rapid prototyping tool is responsive to both a desired throttle position (TPS) input 116 and an actual throttle position input 114. The rapid prototyping tool 118 would be replaced by a similarly-functioned micro-controller or DSP in an actual working system. The actual TPS input 114 is generated by a TPS sensor 112 that is coupled to the throttle blade 104. The desired TPS input 116 corresponds to an external control input, which could originate from such sources as a control input from another part of an engine, or an accelerator pedal. The micro-controller 118 will generate a PWM control and an integrated circuit 120 amplifies the PWM control signal 122, coupled to the power connectors of the throttle blade actuator 106, that drives the throttle blade actuator 106 to a desired position.

Figure 2:
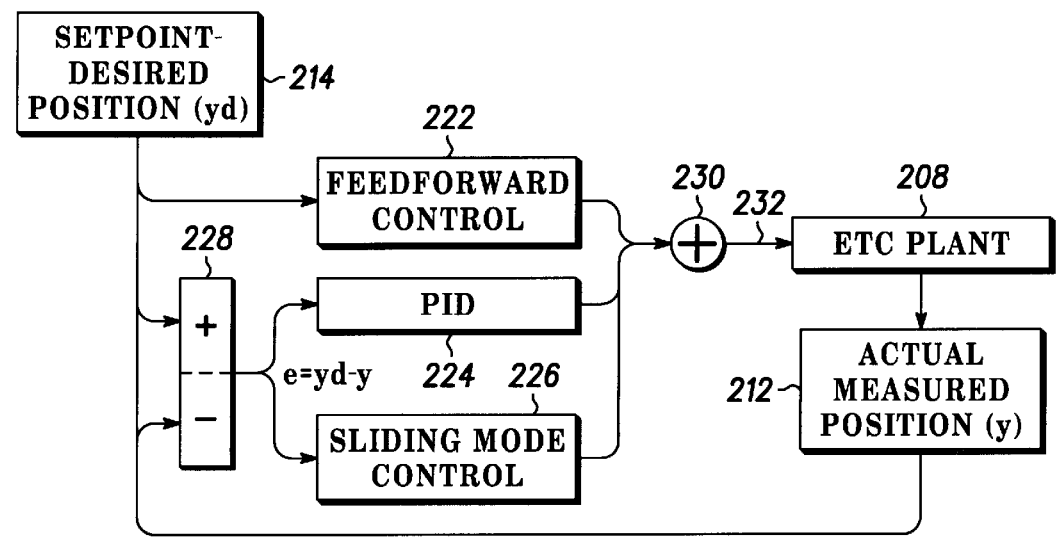
FIG. 2 is a block diagram of one illustrative embodiment of the invention.

As shown in FIG. 2, the electrical portion 200 is part of an electronic throttle controller that includes feedforward 222, a PID 224, an adaptive gain sliding mode control 226 and an adder 230. The feedforward 222 generates a desired position signal that corresponds to the system's set point 214, corresponding to a desired position of the throttle. The feedforward 222 could be implemented as an equation that models ideal behavior of the system or, in the typical case, it could be implemented as a simple look-up table. The PID 224 is responsive to an error signal generator 228, which is a simple adder that subtracts the actual measured position 212 sensed from the electronic throttle 208 from the system's set point 214. The PID 224 generates a first feedback term that compensates for the error signal. The sliding mode control 226 generates a second feedback term that incorporates a solution to a Lyapunov equation applied to the error signal. The adder 230 adds the feedforward control signal, the first feedback term and the second feedback term so as to generate a control signal PWM duty cycle 232. The PID term is given by:

$$PID = K_p e + K_i \int e \, dt + K_d \frac{de}{dt}$$

where $K_p$, $K_i$ and $K_d$ are constants designed based on stability analysis for a normal mathematical model, and where e is defined as:

$$e = y_d - y$$

where $y_d$ is the desired throttle position, and y is the actual throttle position.

The sliding mode control (SMC) is given by:

$$SMC = K_{sm} * \text{sgn}(P_{11}e + P_{12}e' + P_{13}e'')$$

a simplified form is given by:

$$SMC = K_{sm} \text{sgn}(e)$$

where $P = (P_{ij})$ is a 3×3 matrix, a solution from the Lyapunov Algebraic Equation; where e' is the derivative of e and e'' is the second derivative of e; where the sliding gain, $K_{sm}$, is a variable chosen by estimation from known inputs and measurements, i.e., $$K_{sm}(k) = (E(e(k), e(k-1), e(k-2), e(k-3), Ksm(k-1)), (E(\cdot) > 0).$$

Such designed SMC can effectively compensate for nonlinearities, disturbances and uncertainties in the system.

With Lyapunov stability analysis, asymptotic tracking is ensured. While the Lyapunov Equation is generally known to the art of control system design, details of derivation of the above designed PID and SMC terms and selections of control parameters are given in the CD-ROM Appendix.

The following may be useful to the designer when choosing the control parameters:

$ $K_p$, $K_I$ and $K_d$ can be selected based on the stability analysis performed on the mathematical model of the electronic throttle.

$ $K_{sm}$ is updated based on the on-line estimation of unknown dynamics.

$ $P_{11}$, $P_{12}$ and $P_{13}$ are solutions of the Lyapunov equation after the selection of PID.

Figure 3:
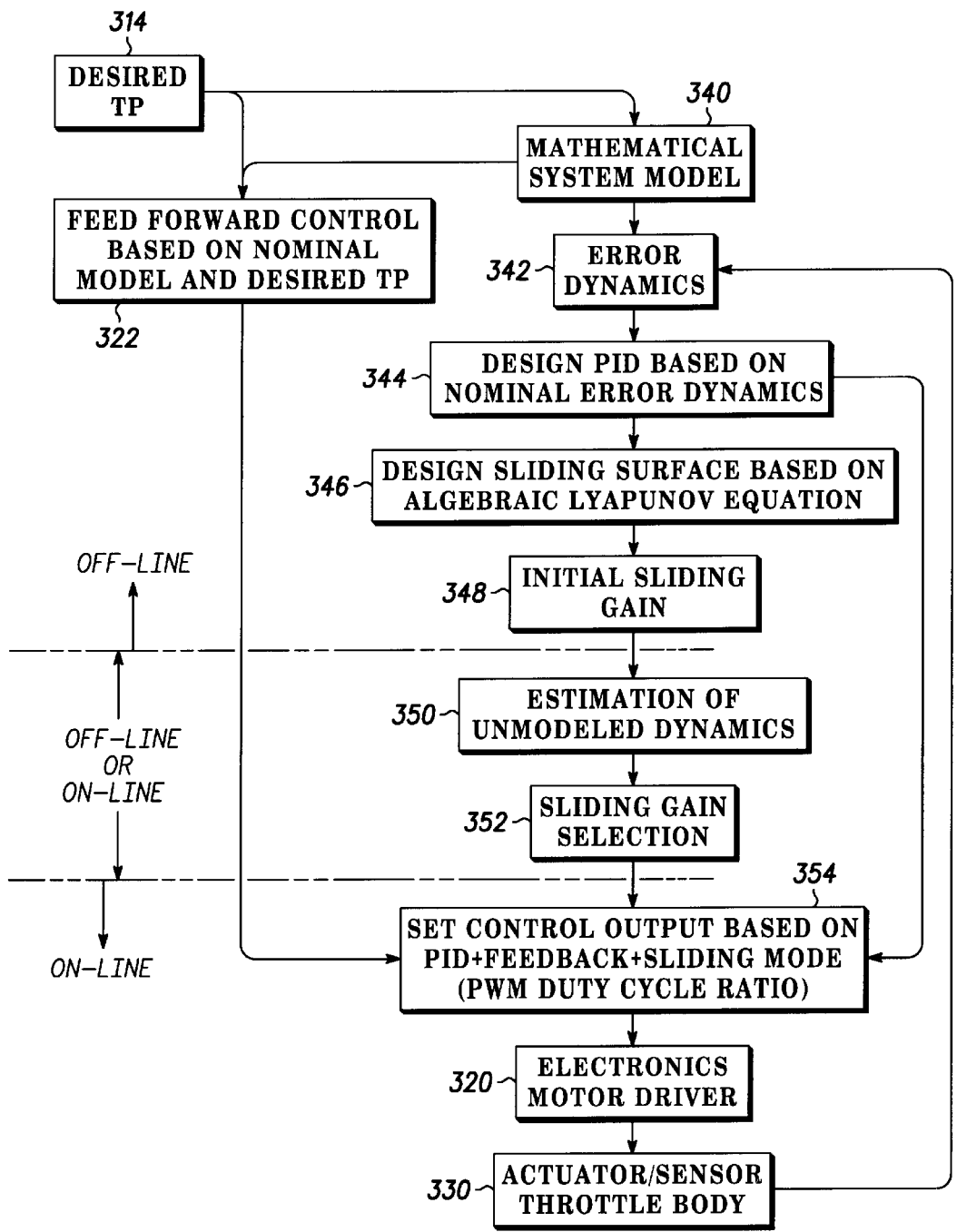
FIG. 3 is a diagram showing the order of the design process and running order of one embodiment of the invention.

As shown in FIG. 3, the desired throttle position 314 is generated from higher level controller, which is used to generate a feedforward control signal 322. This signal is based on a nominal model of the control system and the desired throttle position 314. A nominal mathematical system model 340 is assumed to be known. From that, the error dynamics 342 of the system are determined and the PID term is determined 344 based thereon by using stability analysis. The sliding surface that forms the basis for the SMC term is determined 346 based on the algebraic Lyapunov equation or the simplified form given above. This gives rise to the initial sliding gain 348 for the system. Typically, this part of the model is generated off-line using a computer-based control system design tool. If on-line adaptive sliding gain is used, the initial sliding gain can be set as any small number, in further steps, $K_{sm}$ will be updated properly.

An estimation of unmodeled dynamics 350 is performed and the sliding gain $K_{sm}$ is selected 352, based on the above estimation 350 These two steps could be performed either off-line or on-line. If off-line, a relatively large constant for $K_{sm}$ must be selected. If on-line, $K_{sm}$ will be updated at every control loop. The on-line update of $K_{sm}$ can give better control performance.

The on-line steps performed on an operating system include setting the control output based on the PID term, the feedforward term and the sliding mode term to generate a pulse width modulated duty cycle ratio 354. This is fed to the electronics motor driver 320 to drive the throttle lever control motor. The position of the throttle body is sensed 330 and fed back to the error dynamics step.

The invention results in an electronic throttle control system that is robust. It is also more responsive and accurate than other similar controllers. The control performance such as tracking and robustness are ensured by the design based on Lyapunov theory.

It should be noted that while an electronic throttle controller is disclosed above, the invention is not restricted to electronic throttle controllers. Thus, the scope of the claims that follow apply to any electronic controller. Furthermore, the term PID includes controllers of the following types: P, PI, PD and PID.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An electronic throttle controller, comprising:
   (a) a PID that is capable of generating a first feedback term that compensates for an error signal;
   (b) a sliding mode control that is capable of generating a second feedback term that incorporates a solution to a Lyapunov equation applied to the error signal with sliding gain being updated by an estimation of unknown dynamics;
   (c) a feedforward generated from a desired position signal; and
   (d) an adder that adds the first feedback term, the second feedback term and the desired position signal to generate a control signal.

2. An electronic controller, comprising:
   (a) a PID that is capable of generating a first feedback term that compensates for an error signal;
   (b) a sliding mode control that is capable of generating a second feedback term that incorporates a solution to a Lyapunov equation applied to the error signal with sliding gain being updated by an estimation of unknown dynamics; and
   (c) an adder that adds the first feedback term and the second feedback term so as to generate a control signal.

3. The electronic controller of claim 2, further comprising a feedforward that generates a PWM duty cycle ratio based on a desired position signal.

4. The electronic controller of claim 3, wherein the adder adds the signal generated by the feedforward to the control signal.

5. The electronic controller of claim 2, wherein the PID resides on a digital signal processing chip.

6. The electronic controller of claim 2, wherein the PID resides on a micro-controller.

7. The electronic controller of claim 2, wherein the sliding mode control circuit resides on a digital signal processing chip.

8. The electronic controller of claim 2, wherein the sliding mode control circuit resides on a micro-controller.

9. The electronic controller of claim 2, wherein the adder resides on a digital signal processing chip.

10. A method of controlling an electronic throttle, comprising the steps of:

(a) generating a first feedback term that compensates for an error signal;

(b) generating a second feedback term that incorporates a solution to a Lyapunov equation applied to the error signal, with a sliding gain being updated by an estimation of unknown dynamics; and (c) adding the first feedback term and the second feedback term so as to generate an electronic throttle control signal.

\* \* \* \* \*